United States Patent [19]

Barker

[11] 4,019,154
[45] Apr. 19, 1977

[54] LIGHTNING ROD MIRROR PROTECTION

[75] Inventor: Gerald C. Barker, Palo Alto, Calif.

[73] Assignee: Coherent Radiation, Palo Alto, Calif.

[22] Filed: Oct. 31, 1975

[21] Appl. No.: 627,714

[52] U.S. Cl. .......................................... 331/94.5 T
[51] Int. Cl.² .......................................... H01S 3/02
[58] Field of Search .................................. 331/94.5

[56] References Cited

UNITED STATES PATENTS 3,904,986   9/1975   Hernquist ................. 331/94.5 PE

OTHER PUBLICATIONS

Wright et al., Laser Becomes a Component for Mass—Market Applications, Electronics, vol. 47, (June 13, 1974), pp. 91–95.

Primary Examiner—William L. Sikes
Attorney, Agent, or Firm—Limbach, Limbach & Sutton

[57] ABSTRACT

In order to prevent electrical discharges between the cathode electrode of a gas discharge laser and the closest metal resonator mirror, means are provided adjacent the optical path between the closest resonator mirror and the cathode electrode for conveying the electrical discharge from the cathode electrode to a reflectively inactive area of the mirror. In one preferred embodiment the electrically conducting means is a flanged tube coaxial with the optical path and having the flanged portion in electrical contact with the reflectively inactive area. In other embodiments the electrical conducting means include a metal block having a bore which is coaxial with the optical path; the block being in electrical contact with a reflectively inactive area of the mirror. In still another embodiment the electrical conducting means include a rod projecting from the mirror mounting block which is electrically connected to a reflectively inactive area of the mirror.

7 Claims, 4 Drawing Figures

U.S. Patent    April 19, 1977    Sheet 1 of 2    4,019,154
FIG. 1
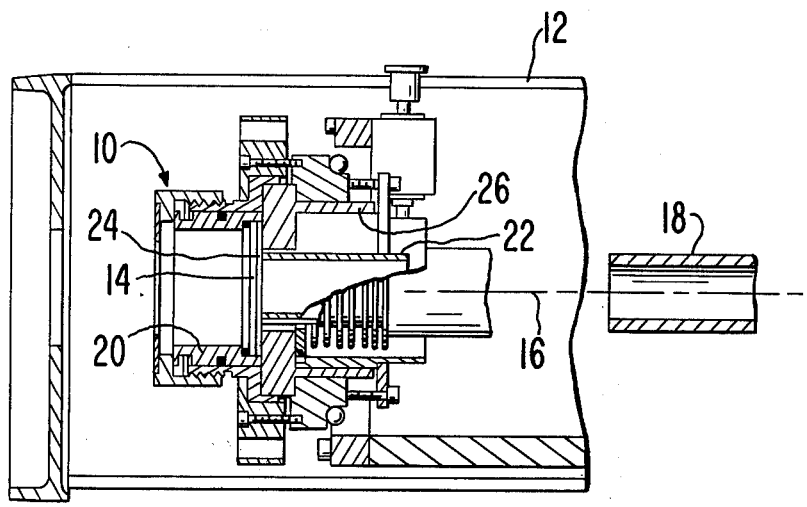
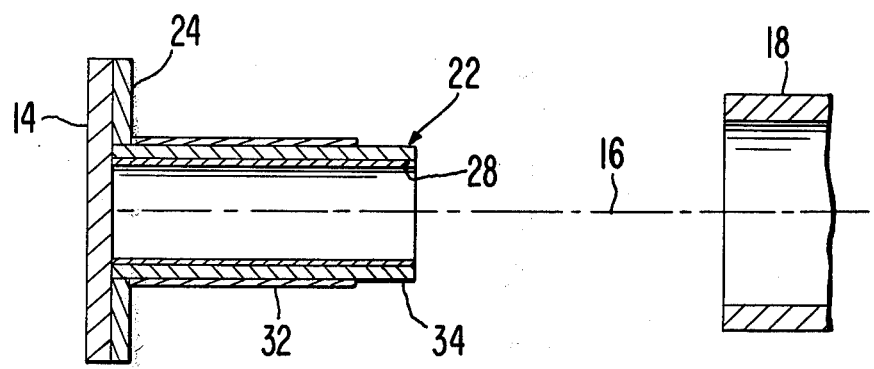
FIG. 2

FIG. 3
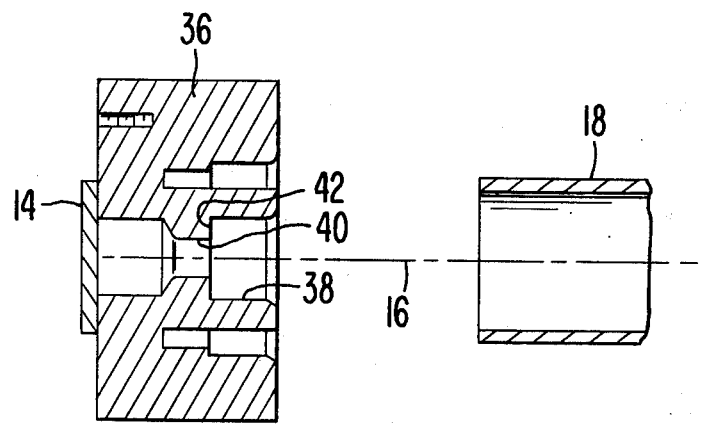
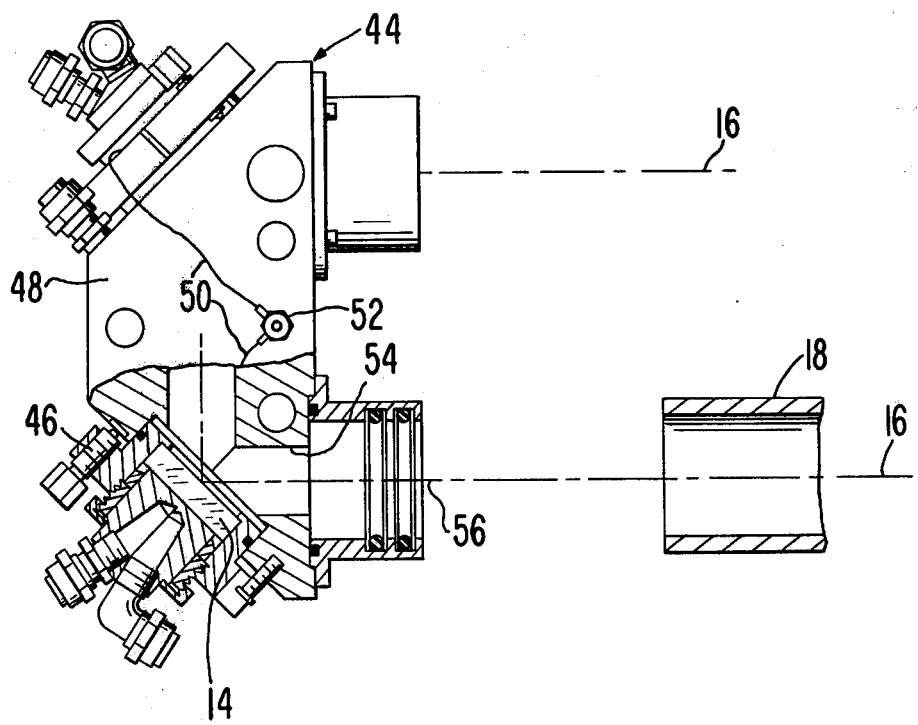
FIG. 4

LIGHTNING ROD MIRROR PROTECTION

BACKGROUND OF THE INVENTION

This invention relates to laser devices, and more particularly to a device for preventing the destruction of the reflecting surface of a resonator mirror in a laser due to electrical discharges from one of the discharge electrodes.

Gas lasers such as the powerful $CO_2$ laser have an anode and a cathode with an electrical discharge between them for activating the laser medium. Aligned with the electrical discharge is a pair of optical resonator mirrors between which light oscillations occur. Precision mirrors used as resonator mirrors include a thin coat, typically of an electrically nonconducting material.

A problem which now exists with lasers like this is that in addition to the discharge between the anode and the cathode, discharges between the cathode and the coated mirror surface also occur if the relative potentials between these components are varied, as for example during initiation or termination of the discharge. This problem is especially serious when the discharge is pulse modulated. This occurs as a result of electrical charge transfer between the mirrored surface and the cathode. These electrical discharges are very serious since they cause a deterioration of optical property of the mirror.

SUMMARY OF THE INVENTION

The above problem in gas discharge lasers is overcome by the present invention of electrically conductive means extending from the resonator mirror closest to the cathode electrode towards the cathode electrode, and adjacent to the optic path, for the purpose of conveying electrical discharges from the cathode electrode to a reflectively inactive area of the closest resonator mirror. In one preferred embodiment the electrically conductive means is a hollow, flanged tube with the flanged portion of the tube being pressed against the outer perimeter of the mirror surface facing the cathode electrode. With the exception of a small portion of the exterior surface closest to the cathode electrode the interior and exterior surfaces of the hollow tubes are anodized to prevent the discharge from terminating too close to the mirror. Similarly in another embodiment the block on which the mirror is mounted is provided with a bore which is coaxial with the optical path and the interior surface of the bore closest to the mirror is anodized to confine the electrical discharge to the outer opening of the bore which is closest to the cathode electrode. In still another embodiment, particularly in a corner mirror assembly, the electrically conductive means includes an electric discharge rod which extends parallel to the optic path and which is force fitted in the corner block. The mounting bracket for the mirror is then electrically connected to the corner block to provide a continuous electrical connection for the discharge path.

By confining the electrical discharge to a point which is distant from the mirror, its surface remains undamaged from both the discharge arc as well as the resultant sputtered material from the electrical discharge.

It is therefore an object of the present invention to provide means in a gas discharge laser for preventing damage to the reflecting surface of the resonator mirror closest to the cathode electrode due to electrical discharges from the cathode electrode.

The foregoing and other objectives, features and advantages of the invention will be more readily understood upon consideration of the following detailed description of certain preferred embodiments of the invention, taken in conjunction with the accompanying drawings.

BRIEF DESCRIPTION OF THE DRAWINGS

FIG. 1 is a vertical view, partly in section and with portions broken away of one of the resonator mirror assemblies of a gas laser;

FIG. 2 is an enlarged, vertical view, in section, of the electrical discharge device of the embodiment depicted in FIG. 1;

FIG. 3 is an enlarged, vertical view, in section, of a resonator mirror assembly of a second embodiment of the invention; and FIG. 4 is a vertical view, partly in section and with portions broken away, of a corner block mirror assembly according to still another embodiment of the invention.

DETAILED DESCRIPTION OF THE PREFERRED EMBODIMENTS

Referring now more particularly to FIG. 1, an end mirror assembly 10 of a gas laser 12, such as Coherent Radiation's Model 42 $CO_2$ gas laser, is illustrated in which a resonator mirror 14 is mounted within the mirror assembly 10. The mirror 14 together with similar mirror, not shown, which faces it at the opposite end of the laser 12 define an optical path 16. One of the mirrors is totally reflecting and the other partially transmissive. A cathode electrode 18 is positioned to be coaxial with the optical path 16 and is spaced from the mirror 14.

The mirror 14 is held within a mirror retainer plug 20 mounted within the mirror assembly 10. The surface of the mirror 14 which faces the cathode 18 is, of course, either totally or partially reflective.

In order to prevent the discharge of electrical potential between the cathode 18 and the reflective surface of the mirror 14 a hollow sleeve 22 is positioned between the mirror 14 and the cathode 18 and is coaxial with the optical path 16. The tube 22 is provided with an end flange 24 which abuts against the outer perimeter of the surface of the mirror 14 and is in electrical contact with it. The flanged tube 22 is held in place against the mirror and within the mirror assembly 10 by means of an annular insulator 26.

Referring now more particularly to FIG. 2, the annular tube 22 is shown enlarged. The interior surface 28 of the tube 22 is anodized beginning at the portion of the surface nearest the flange 24 and extending the full length of the interior surface ending at the opening of the tube 22 which faces the cathode 18. The exterior surface 32 of the sleeve 22 is likewise anodized from the flange 24 outwardly towards the open end 22 of the tube, stopping just short of the end to leave an outer unanodized surface 34. This unanodized portion 34 of the exterior surface is electrically conductive, whereas the anodized surfaces 28 and 32 are electrically insulating. The surface 34 is intended to be the primary electrically conducting surface for the discharge of electrical potential from the cathode 18 to the tube 22. The portion of the surface of the flange 24 which abuts the mirror 14 is also uninsulated to make good electrical contact with the metal mirror 14. By this means the electrical discharge of potential between the cathode electrode 18 and the mirror 14 takes place at the uninsulated portion of the tube 34 and does not strike the reflective surface of the mirror 14.

Referring now more particularly to FIG. 3, a second embodiment of the invention is illustrated in which the mirror 14 is positioned against a metallic mirror block 36 having a bore 38 aligned along the optical path 16. It should be understood that the mounting bracket for the mirror 14 is not shown in FIG. 3 for clarity of illustration. The bore 38 is provided with a reduced diameter portion 40 which creates a shoulder 42 facing the cathode electrode 18. The entire surface of the bore 38 is anodized save for the surface of the shoulder 42 facing the cathode eectrode 18. It is this unanodized surface 42 which acts as the electrical discharge point for the discharge of potential existing between the cathode electrode 18 and the mirror block 36. The mirror block 36 is, of course, in good electrical contact with a reflectively inactive area of the mirror 14 so that no discharge takes place at the reflecting surface of the mirror 14.

Referring now more particularly to FIG. 4, a third embodiment of the invention is illustrated for use with a corner mirror cell assembly 44 for a folded gas laser in which a pair of totally reflecting mirrors 14 are mounted at 90° angles with respect to each other and at 45° angles with respect to the optical path 16. The mirrors 14 are each held in an assembly 46 which is mounted on the corner block 48. The mirror assemblies 46 and the corner block 48 are metallic. In order to provide electrical interconnection between the various assemblies, a length of fourteen gauge wire 50 connects each of the mirror assemblies 46 with a plug 52 in the corner block.

The corner block 48 is provided with bores 54 which are coaxial with the optical path 16 and are intersected at 45° by the mirror surfaces 14. In order to prevent the discharge of electrical potential from the cathode 18 to the reflective surface of the mirror 14 a metallic rod 56 which is parallel to the optical path 16 is force fitted into a bore (not shown) in the corner block 54 to extend from the corner block 48 towards the cathode electrode 18. Because the rod 56 is electrically connected to the corner block 48 which, in turn, is electrically connected by means of the wires 50 to the mirror assemblies 46, and because the mirrors 14 are electrically connected to the mirror assemblies 46 the electrical discharge of potential from the cathode 18 strikes the rod 56 rather than the reflective surface of the mirror 14.

In all of the above described embodiments, it should be noted that the point of electrial discharge with the conducting means takes place at an extended distance from the mirror surface. The reason for this is that the impact of the electrical discharge on the tip of the conducting device does cause some sputtering.

While in the above described embodiments certain configurations for the electrically conducting means have been given, it should be apparent that in other embodiments variations of such conducting means could also be suitable without departing from the spirit and scope of the invention as defined by the following claims.

The terms and expressions which have been employed herein are used as terms of description and not of limitation, and there is no intention, in the use of such terms and expressions, of excluding equivalents of the features shown and described, or portions thereof, it being recognized that various modifications are possible within the scope of the invention claimed.

What is claimed is:

1. An improved laser device of the type having resonator mirrors defining an optic path and spaced apart cathode and anode electrodes intermediate the mirrors and aligned along the optic path, wherein the improvement comprises electrically conductive means extending adjacent the optic path from the mirror closest to the cathode towards the cathode for conveying electrical discharges from the cathode to the closest mirror, whereby electrical discharges between the cathode and the closest mirror are nondestructively conducted thereto.

2. An improved laser device as recited in claim 1 wherein the electrically conductive means comprise an electrically conducting member having a bore therein which is coaxial with the optical path, the member having one end which is in electrically conductive contact with the outer perimeter of the surface of the mirror closest to the cathode electrode.

3. An improved laser device as recited in claim 2 wherein the member is a hollow tube having a flanged end in contact with the outer perimeter of the mirror's surface.

4. An improved laser device as recited in claim 2 wherein the interior surface of the bore is anodized with the exception of a portion near to the cathode, whereby the electrical discharge from the cathode is confined to the unanodized portion of the interior surface.

5. An improved laser device as recited in claim 1 wherein the electrically conductive means comprise a discharge rod, means for mounting the rod adjacent to the optical path, and means for electrically interconnecting the discharge rod and a surface of the mirror.

6. An improved gas laser device of the type having resonator mirrors defining an optic path, each mirror having both reflecting and reflectively inactive areas, and spaced apart discharge electrodes intermediate the mirrors for stimulating lasing of the gas, wherein the improvement comprises electrically conductive means extending adjacent the optic path from a mirror closest to a selected one of the electrodes towards the selected electrode for conducting electrical discharges between the reflectively inactive ara of the closest mirror and the selected electrode.

7. An improved gas laser device of the type having resonator mirrors defining an optic path and spaced apart discharge electrodes intermediate the mirrors for stimulating lasing of the gas, wherein the improvement comprises electrically conductive means extending adjacent the optic path from a mirror closest to a selected one of the electrodes towards the selected electrode for conducting electrical discharges between the surface of the closest mirror and the selected electrode.

* * * * *

UNITED STATES PATENT AND TRADEMARK OFFICE
CERTIFICATE OF CORRECTION

PATENT NO. : 4,019,154
DATED : April 19, 1977
INVENTOR(S) : Gerald C. Barker

It is certified that error appears in the above—identified patent and that said Letters Patent is hereby corrected as shown below:

Sheet 2 of the drawings should be deleted to insert the attached sheet therefor.

Signed and Sealed this

Eleventh Day of March 1980

[SEAL]

Attest:

SIDNEY A. DIAMOND

*Attesting Officer*  *Commissioner of Patents and Trademarks*

FIG. 3
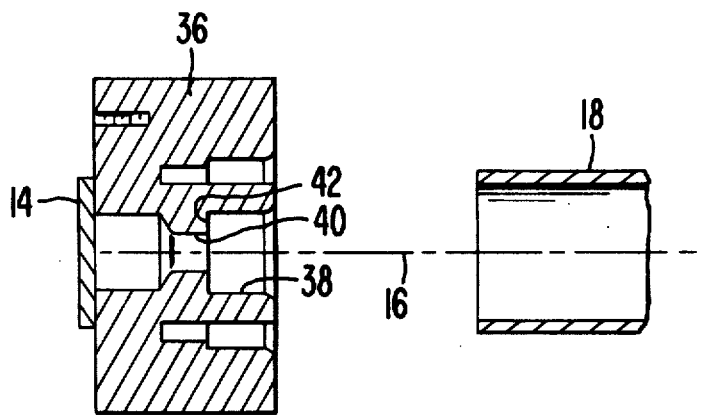
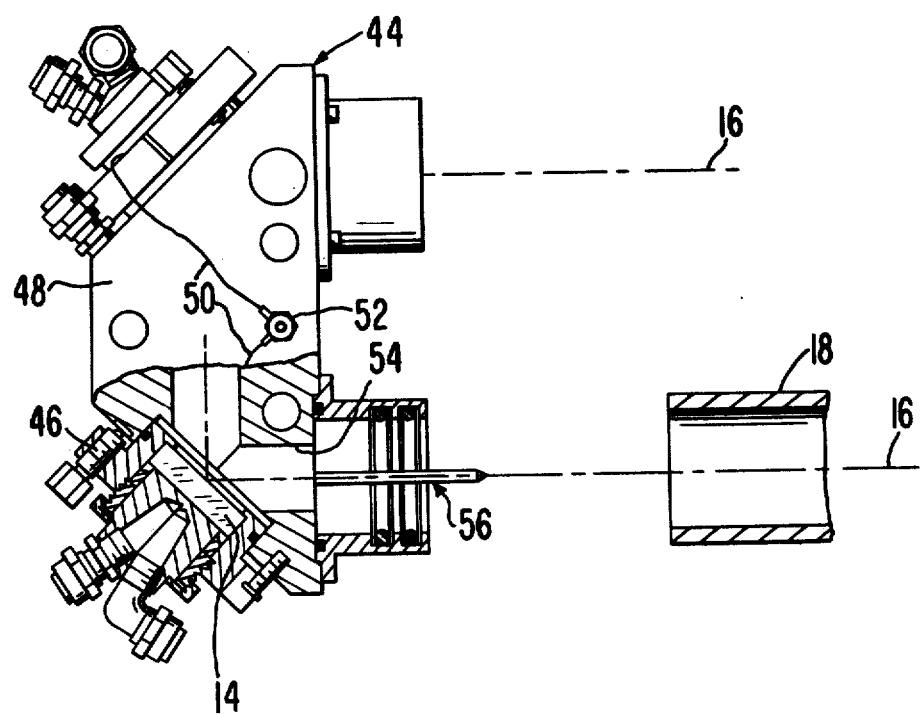
FIG. 4